(12) United States Patent
Ranjan et al.

(10) Patent No.: US 8,544,075 B2
(45) Date of Patent: Sep. 24, 2013

(54) EXTENDING A CUSTOMER RELATIONSHIP MANAGEMENT EVENTING FRAMEWORK TO A CLOUD COMPUTING ENVIRONMENT IN A SECURE MANNER

(75) Inventors: Shashi Ranjan, Redmond, WA (US); Nirav Shah, Bothell, WA (US); Mahesh Hariharan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 12/816,023

(22) Filed: Jun. 15, 2010

(65) Prior Publication Data

US 2011/0307948 A1   Dec. 15, 2011

(51) Int. Cl.
*G06F 21/34* (2013.01)

(52) U.S. Cl.
USPC .......... 726/9; 726/1; 726/12; 726/26; 713/153

(58) Field of Classification Search
USPC ............................................................ 726/9
See application file for complete search history.

(56) References Cited

U.S. PATENT DOCUMENTS

| | | | |
|---|---|---|---|
| 7,523,461 B2 | 4/2009 | Ghanaie-sichanie | |
| 7,552,443 B2 | 6/2009 | Upton | |
| 7,558,783 B2 | 7/2009 | Vadlamani | |
| 8,281,382 B1* | 10/2012 | Sanyal et al. | 726/9 |
| 2005/0147130 A1* | 7/2005 | Hurwitz et al. | 370/503 |
| 2007/0186280 A1* | 8/2007 | Das et al. | 726/12 |
| 2008/0083025 A1* | 4/2008 | Meijer et al. | 726/9 |
| 2008/0215748 A1* | 9/2008 | Kagan et al. | 709/232 |
| 2008/0229402 A1* | 9/2008 | Smetters et al. | 726/9 |
| 2009/0089128 A1* | 4/2009 | Tkatch et al. | 705/8 |
| 2009/0300169 A1* | 12/2009 | Sagar et al. | 709/224 |
| 2009/0313687 A1* | 12/2009 | Popp et al. | 726/9 |
| 2010/0082737 A1 | 4/2010 | Dankle | |
| 2010/0169497 A1* | 7/2010 | Klimentiev et al. | 709/228 |
| 2010/0191613 A1* | 7/2010 | Raleigh | 705/26 |
| 2010/0192207 A1* | 7/2010 | Raleigh | 726/6 |
| 2010/0205541 A1* | 8/2010 | Rapaport et al. | 715/753 |
| 2010/0306599 A1* | 12/2010 | Cota-Robles et al. | 714/48 |
| 2011/0126275 A1* | 5/2011 | Anderson et al. | 726/8 |
| 2011/0307947 A1* | 12/2011 | Kariv et al. | 726/9 |

OTHER PUBLICATIONS

A Developers Guide to Microsoft Azure—Published Date: Mar. 29, 2010  http://www.codeguru.com/vb/gen/article.php/c17035, pp. 1-30.
CRM on a Cloud Challenges Software-as-a-service—Published Date: Jun. 17, 2008 http://blogs.eweek.com/masked_intentions/content/crm/crm_on_a_cloud_challenges_softwareasaservice.html , pp. 1-3.
Jon R. White, : "Extending Microsoft CRM with Reusable Patterns"—Retrieved Date: Apr. 6, 2010 http://msdn.microsoft.com/en-us/library/ms913853.aspx , pp. 1-10.
New Features in Neuron ESB 2.5—Retrieved Date: Apr. 6, 2010 http://www.neuronsb.com/esb-software-products/neuron-esb-what-is-new.aspx , pp. 1-5.

* cited by examiner

*Primary Examiner* — Kambiz Zand
*Assistant Examiner* — Yonas Bayou
(74) *Attorney, Agent, or Firm* — Merchant & Gould

(57) ABSTRACT

A customer relationship management (CRM) eventing framework may be extended to a cloud computing environment. A listening channel may be opened between a service and a service bus in a cloud computing environment. The cloud computing environment may also include an authenticating service. Service information for the service may be registered with a CRM. The CRM may receive a request made by a requester. The request may trigger a request processing pipeline in an eventing framework. The CRM may post event data responsive to the request to the service bus. The service may receive the event data, process it and may send back a confirmation or response. The CRM may finally send a response to the requester.

19 Claims, 6 Drawing Sheets

EXTENDING A CUSTOMER RELATIONSHIP MANAGEMENT EVENTING FRAMEWORK TO A CLOUD COMPUTING ENVIRONMENT IN A SECURE MANNER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Customer relationship management ("CRM") is a broadly recognized, widely-implemented strategy for managing and nurturing a company's interactions with clients and sales prospects. CRM may be implemented by software which utilizes a computer system to organize, automate, and synchronize business processes, including sales activities, marketing, customer service and technical support. Some of the overall goals of CRM include finding, attracting, and winning new clients, nurturing and retaining those clients the company already has, enticing former clients back into the fold, and reducing the costs of marketing and client service.

CRM software may include a pluggable eventing framework which may comprise, for example, an interface utilized to associate business logic with the creation of records in a CRM system. An eventing framework includes a semi-ordered collection of system and custom plug-ins for processing requests for information which occur in the CRM system (e.g., the creation of business records). In particular, plug-ins are organized by stages but there is no order within a stage. Currently, however, the eventing framework is restricted to code executing within the CRM system (i.e., a platform which may be a synchronous or asynchronous sandbox server), thus limiting external service integration with the CRM system. In particular, external or third-party systems which establish connections via "cloud-based" systems (and which may or may not themselves be hosted in the "cloud") are unable to participate in the request processing of the eventing framework without having to upload code into the CRM system. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for extending a customer relationship management (CRM) eventing framework to a cloud computing environment. A listening channel may be opened between a service and a service bus in a cloud computing environment. The cloud computing environment may also include an authenticating service. Service information (i.e., details about the service such as its location, binding, and contract) may be registered with a CRM. The CRM may receive a request made by a requester. The request may trigger a request processing pipeline in an eventing framework. The CRM may post event data responsive to the request to the service bus. The CRM may then send a response to the requester.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for extending a customer relationship management (CRM) eventing framework to a cloud computing environment. A listening channel may be opened between a service and a service bus in a cloud computing environment. The cloud computing environment may also include an authenticating service. Service information may be registered with a CRM. The CRM may receive a request made by a requester. The request may trigger a request processing pipeline in an eventing framework. The CRM may post event data responsive to the request to the service bus. The CRM may then send a response to the requester.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
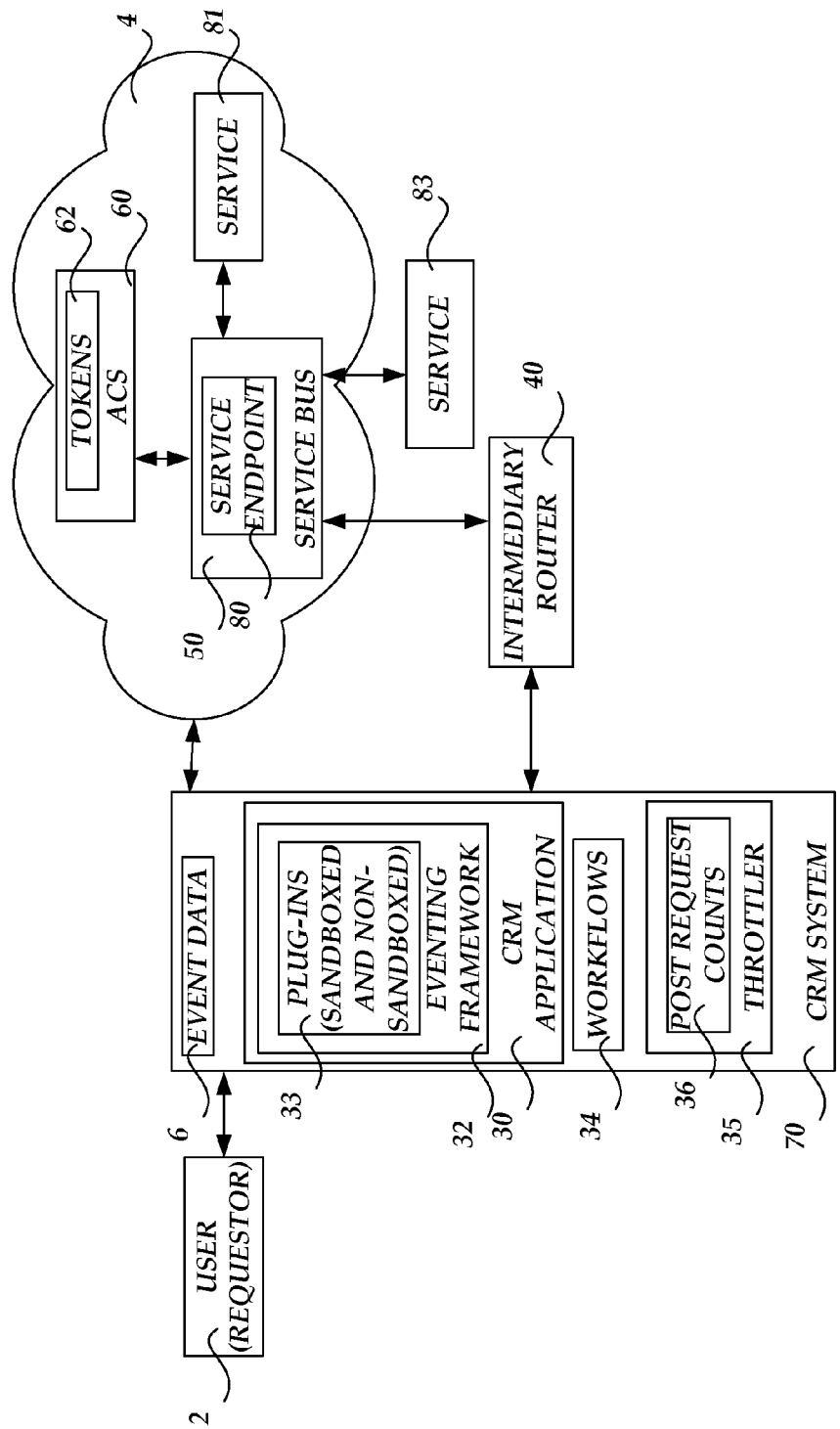
FIG. 1 is a block diagram illustrating a network architecture for extending a customer relationship management (CRM) eventing framework to a cloud computing environment, in accordance with various embodiments.

Referring now to the drawings, in which like numerals represent like elements through the several figures, various aspects of the present invention will be described. FIG. 1 a block diagram illustrating a network architecture for extending a customer relationship management (CRM) eventing framework to a cloud computing environment, in accordance with various embodiments. The network architecture includes a user 2 which is in communication with a CRM computer system 70 (hereinafter referred to as "the CRM 70"). The CRM 70 is in communication with a cloud computing environment 4, either directly, or via an intermediary router 40. As will be discussed in greater detail below with respect to FIG. 2, the CRM application 30 may be configured to extend the eventing framework 32 to a third-party service through the cloud computing environment 4 (i.e., outside of the CRM 70). In accordance with an embodiment, the CRM 70 may comprise a CRM application 30. As is known to those skilled in the art, CRM applications may be utilized to organize, automate, and synchronize business processes, including sales activities, marketing, customer service and technical support. The CRM application 30 may include a pluggable eventing framework 32 (hereinafter referred to as "the eventing framework 32") and a collection of plug-ins 33. The pluggable eventing framework may comprise an interface utilized to associate business logic with the creation of records in the CRM 70. The plug-ins 33 in the eventing framework 32 may include a semi-ordered collection of standard and custom sandboxed and non-sandboxed plug-ins. In particular, plug-ins may be organized by stages but there is no order within a stage. The plug-ins 33 in the eventing framework 32 may further comprise, in accordance with an embodiment, a CRM request processing pipeline. As defined herein, plug-ins may include code modules that can be executed inside a CRM to modify incoming request data and the outgoing response. In accordance with an embodiment, the eventing framework 32 in the CRM application 30 may be utilized for software development kit ("SDK") request processing. The SDK request processing may include Application Programming Interface ("API") request processing. The CRM application 30 may comprise the MICROSOFT DYNAMICS CRM software product from MICROSOFT CORPORATION of Redmond, Wash. It should be understood that the embodiments described herein should not be construed as being limited to the aforementioned software application and that other software applications from other developers and/or manufacturers may also be utilized.

The CRM 70 may also include event data 6, workflows 34, and a throttler module 35. As will be described in greater detail below, the throttler module 35 may maintain post request counts 36 in the CRM 70. In accordance with an embodiment, the event data 6 may comprise information related to events which occur in the CRM 70. The workflows 34 may comprise CRM workflows associated with the performance of various CRM activities (e.g., organizing, automating, and synchronizing business processes, including sales activities, marketing, customer service and technical support) within the CRM 70. The workflows 34 may further comprise custom workflow activities occurring or registered with the CRM 70. The throttler 35 may include a count of successful and failed attempts made by the CRM application 30 to post the event data 6 to a service bus in the cloud computing environment 4 (which is ultimately posted to one or more third-party services residing inside or outside of the cloud computing environment 4). An illustrative routine for counting attempted post requests and for the automatic retry of failed post attempts to the cloud computing environment 4 will be described in greater detail below with respect to FIG. 5.

The user 2 which is in communication with the CRM 70 in the network architecture of FIG. 1 may comprise a user of the CRM 70. In accordance with an embodiment, the user 2 makes a request to the CRM 70, via an SDK or a web application, for the event data 6 (i.e., CRM data). The processing of the request initiates a request pipeline within the eventing framework 32 which raises events and executes various plug-ins (e.g., the plug-ins 33). The event data 6 may be posted out to a service bus. Eventually, a response to the request is returned from the CRM 70.

The cloud computing environment 4, which may comprise a wide area network (e.g., the Internet), includes a service bus 50, an ACS (access control service) 60, and an optional service 81. In accordance with various embodiments, the service bus 50 may comprise a service endpoint 80 and is also in communication with the optional service 81 as well as another optional service 83 which is outside of the cloud computing environment 4. In the foregoing discussion, the optional services 81 and 83 will be referred to as the service 81/83. The service endpoint 80 may comprise a third-party service (such as a server running an information technology ("IT") website) in the cloud computing environment 4. In particular, the service endpoint 80 may comprise a location where message packets may be sent. When message packets are received at the service endpoint 80 on the service bus 50, they may be routed to the service 81/83 or, alternatively, they may be cached on the service bus 50 when using message buffers. As will be discussed in greater detail below with respect to FIG. 2, the service 81/83 may be configured to receive the event data 6 from the CRM 70 via the service bus 50. In accordance with various embodiments, the service 81/83 may be configured to receive messages in either an asynchronous (i.e., one-way) or synchronous (i.e., two-way or duplex) manner, based on the registration of service information for the service 81/83 in the CRM 70. In accordance with various embodiments, operation contracts may include one-way contracts, two-way contracts, binding REST (Representational State Transfer) contracts, WS-Trust contracts, etc. When the service information for the service 81/83 is registered with the CRM 70, support may be provided to indicate when the posting of the event data 6 should happen. It should be appreciated by those skilled in the art that the registration process associated with the service information for the service 81/83 may be similar to registering plug-in code in the CRM 70 on a request pipeline. In accordance with various embodiments, when a request pipeline is invoked in response to a user request (i.e., when the user 2 requests the event data 6 from the CRM 70), post logic in the CRM 70 may be triggered.

The service bus 50 may be utilized as a "broker" for the exchange of data between the CRM 70 and the service 81/83. In particular, the service bus 50 may be utilized by the CRM application 30 to extend the eventing framework 32 to the cloud computing environment 4. As will be discussed in greater detail below with respect to FIG. 2, the service bus 50 may be configured to receive event data for later retrieval by the service 81/83. In particular, the service bus 50 may be configured to receive the event data 6 which is responsive to a request made by the user 2 of the CRM 70 and which is posted to the service bus 50 by the CRM application 30 executing on the CRM 70. The service bus 50 may further optionally be configured to receive a confirmation of the retrieval of the event data 6 by the service 81/83. In accordance with an embodiment, the service bus 50 may comprise a service bus within the "Fabric" component of the WINDOWS AZURE PLATFORM cloud operating system from MICROSOFT CORPORATION of Redmond, Wash. In accordance with an embodiment, the service bus 50 may comprise an enterprise bus in the cloud computing environment 4. It should be understood that the service bus 50 may allow for two types of event handling. A first type of event handling allowed by the service bus 50 may include events published from different sources that may be queued for a small duration in the cloud computing environment 4 before they are retrieved by service instances in a First In, First Out ("FIFO") order. Messages may be retrieved by the service bus 50 by polling a message buffer (not shown) in the cloud computing environment 4. A second type of event handling allowed by the service bus 50 may include events received by services registered on the service bus. Unlike the message buffer, the services are transient unless an active service is listening to them. Furthermore, messages (e.g., event messages) are delivered to the active service as they are received. It should be understood that the embodiments described herein should not be construed as being limited to the aforementioned cloud operating system and that other cloud operating systems from other developers and/or manufacturers may also be utilized.

The ACS 60 may be utilized as an authenticating service. For example, the ACS 60 may be utilized for authenticating the CRM 70 to the service bus 50 in the cloud computing environment 4. It should be understood that the service bus 50 and the ACS 60 may be collectively hosted together on a single server in the cloud computing environment 4. In accordance with an embodiment, the ACS 60 may also comprise a security token service ("STS") (not shown). As will be discussed in greater detail below with respect to FIGS. 2-3, the ACS 60 may be configured to provide authentication for communications between the CRM 70 and the service bus 50. The ACS 60 may further comprise authentication tokens 62 which may include one or more federated tokens (described below). It should be understood that in authenticating to the service bus 50, the CRM 70 may use a self-generated security assertion markup language ("SAML") assertion. It will be appreciated that the SAML assertion may include basic assertions such as an organization name, user information, impersonated user information, etc. to allow fine tuning of ACS rules. As should be understood by those skilled in the art, ACS 60 may comprise a rule engine that consumes input data and runs a set of rules on the input data to generate output data (i.e., claims) which are encapsulated inside a token and sent to a requester. In accordance with an embodiment, the CRM 70 may be configured to send input claims and based on the rules configured in the ACS 60 and, in response, output claims in a token are returned. The token may be strapped on to an outgoing request to post data to the service bus 50. The service bus 50 may then examine the token (i.e., an authentication token 62), validate it, and allow the CRM 70 to post the data.

In accordance with various embodiments, the CRM 70 may operate in a "Normal" mode or a "Federated" mode for authenticating operations with the service bus 50 and the service 81/83. Normal and Federated authentication will be described in greater detail below with respect to FIGS. 2-3.

The intermediary router 40 may comprise a component which functions as an intermediary between the CRM 70 and the cloud computing environment 4. It should be understood that in accordance with various embodiments, the intermediary router 40 is an optional component in the network architecture of FIG. 1. In particular, in accordance with some embodiments, the CRM 70 may be configured to communicate directly with the cloud computing environment 4, while in other embodiments, the CRM 70 may be configured to communicate with the intermediary router 40 which then passes the communication from the CRM 70 on to the cloud computing environment 4. It should be understood that the intermediary router 40 may also be used for different purposes such as for overcoming network and firewall restrictions, etc.

Figure 2:
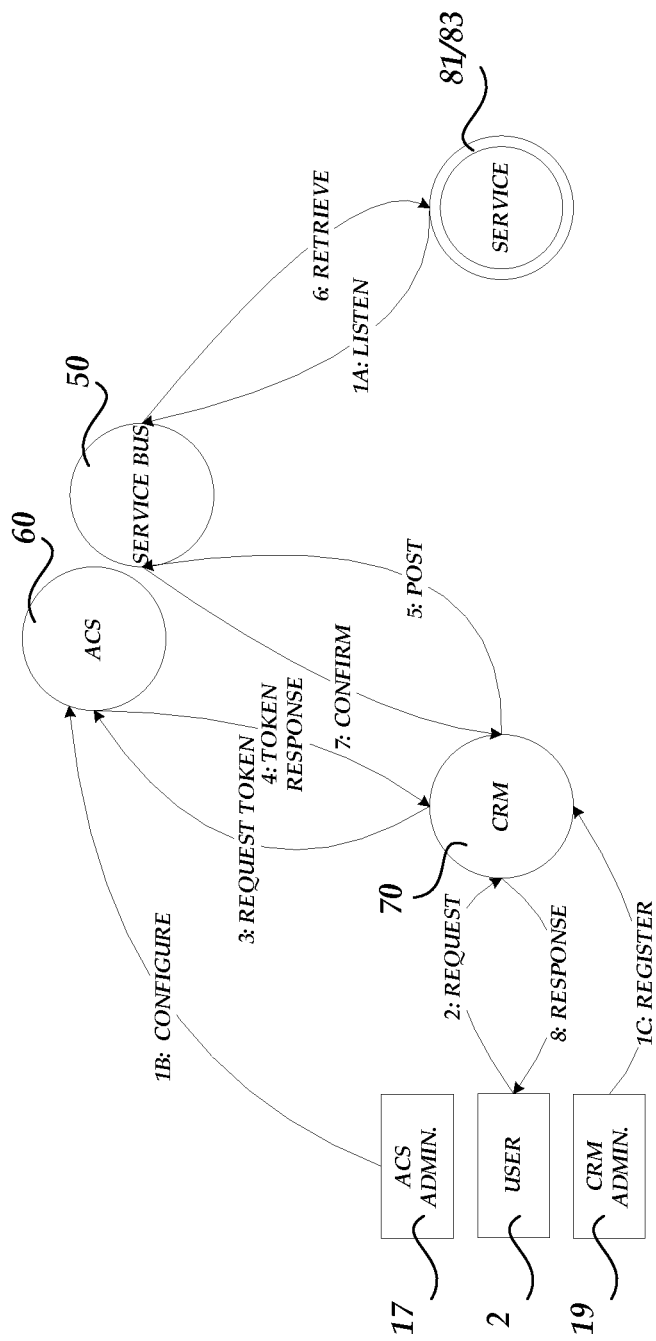
FIG. 2 illustrates an example process of using a CRM system to extend an eventing framework to a cloud computing environment and authenticating a CRM with a service bus in a Normal mode, in accordance with various embodiments.

FIG. 2 illustrates an example process of using a CRM system to extend an eventing framework to a cloud computing environment and authenticating a CRM with a service bus in a Normal mode, in accordance with various embodiments. The process of FIG. 2 begins when the service 81/83 opens a listening channel on the service bus 50 so the service 81/83 may receive the event data 6 from the CRM 70 (via the service bus 50). In accordance with an embodiment, the service 81/83 may utilize a unique identification and event creation time, available on a posted event, to enable duplicate detection. For example, duplicates may be posted when there is a network failure in returning a response to a successful post. In this situation, the CRM 70 would not realize that the previous post was successful and will retry. In accordance with an embodiment, the service 81/83 may also utilize a unique identification and event creation time, available on a posted event, to enable synchronization with respect to the receiving of the event data 6. In particular, asynchronous posts of the event data 6 are not guaranteed to be in order of their creation. Thus, the creation time may be used to synchronize events at the listener end of the listening channel on the service bus 50. An ACS administrator 17 may configure ACS rules to allow the CRM 70 to post the event data 6. Then, a CRM administrator 19 may register service information (i.e., details about the service 81/83 such as its location, binding, and contract) with the CRM 70. As discussed above, the registration process associated with service information for the service 81/83 may be similar to registering plug-in code in the CRM 70 on a request pipeline. In accordance with an embodiment, the service information for the service 81/83 may be registered similar to any other CRM entity (e.g., a plug-in). For example, a record with information about the service 81/83 may be created in the CRM 70. During registration, a service record for the service 81/83 in the CRM 70 may be referenced. In accordance with another embodiment, the CRM 70 may be configured to allow users to register service information on any request pipeline and post data when executed (i.e., when the pipeline is executed in response to a request made by the user). It should be understood that during the registration process, an indication may be made as to when the post of the event data 6 should happen and whether the CRM 70 should notify the service 81/83.

The process of FIG. 2 continues when the CRM 70 receives a request made by the user 2. It should be understood that the event may serve as a trigger which invokes a request processing pipeline in the eventing framework 32.

The process of FIG. 2 continues when the CRM 70 requests an authentication token 62 from the ACS 60 for the service bus 50. In particular, the CRM application 30 executing on the CRM 70 may be configured to request an authentication token 62 (shown in FIG. 1) from the service bus 50 so that the eventing framework 32 may be securely extended to the cloud computing environment 4. The process of FIG. 2 continues when the CRM 70 sends a request to the ACS 60 to retrieve an authentication token 62 for the service bus 50. The authentication token 62 is posted to the service bus 50, along with the event data 6, as part of a custom header. The service bus 50 then validates the custom header token and allows the CRM 70 to post the event data 6. It should be understood that the authentication described corresponds to a Normal mode of authentication in accordance with an embodiment. It will be appreciated that in accordance with an alternative embodiment, authentication may also occur in a Federated mode which will be described in greater detail with respect to the flow diagram of FIG. 3, below.

The process of FIG. 2 continues when the CRM 70 posts the event data 6, which is responsive to the request made by the user 2, to the service bus 50. In particular, the CRM 70 may be configured to post the event data 6 to the service bus 50 in the cloud computing environment 4 (i.e., by sending a post request to the service bus 50). It should be understood, in accordance with various embodiments, that the event data 6 may be posted to the service bus 50 in a number of ways including, but not limited to, posting via one or more CRM workflows 34, posting via the plug-ins 33, and posting via the intermediary router 40. As discussed above, the plug-ins 33 may include sandbox or non-sandboxed plug-ins. It should further be understood, in accordance with various embodiment, the CRM 70 may be configured to post the event data 6 to the service bus 50 asynchronously or synchronously. In accordance with an embodiment, requests to post the event data 6 to the service bus 50 may be "throttled." In particular, when the CRM 70 sends a current request to post the event data 6 to the service bus 50, the CRM 70 may be configured to utilize the throttler module 35 to mitigate misuse. As will be described in greater detail below with respect to FIG. 3, the throttling mechanism may be utilized to allow a threshold number of attempts by the CRM 70 to post event data within a given duration.

The process of FIG. 2 continues when the service 81/83 retrieves the event data 6 from the service bus 50. Once the event data 6 has been retrieved from the service bus 50, the process of FIG. 2 continues when the CRM 70 receives a confirmation that the event data 6 has been retrieved from the service bus 50 by the service 81/83. In particular, the CRM application 30 executing on the CRM 70 may be configured to receive a confirmation message from the service bus 50 that the posted event data 6 was retrieved in the cloud computing environment 4. It should be understood that, when the service endpoint 80 comprises a message buffer (i.e., "FIFO"), then the confirmation is sent out by the service bus 50. However, when the service endpoint 80 comprises an active service endpoint to which a service is listening, the confirmation is sent out by the service 81/83. In accordance with an embodiment, the CRM 70 may also post to the service 81/83 via a one way User Datagram Protocol ("UDP") where no confirmation of the post is received. It should be understood that the service 81/83 may also return data for further consumption by the CRM 70 to facilitate request processing. For example, an illustrative process may include the following steps: (1) a user may make a request to update a CRM record; (2) a custom plug-in is registered with the CRM system to post the event to a cloud computing environment to which a service is listening; (3) the event is generated by the CRM and posted to the service; (4) the service consumes the event and responds with data (assuming the use of a two-way contract); (5) the data is received inside the custom plug-in, and based on the data, sets some extra fields; and (6) a response is returned.

The process of FIG. 2 ends when the CRM 70 sends a response to the user 2. It should be understood that the process described above with respect to FIG. 2 may also be described as follows: (1) A CRM user makes a request to create or retrieve a record in the CRM; (2) the request is received by the CRM and is encapsulated into a context object; (3) the context object includes fields that are initialized by the eventing framework with the information needed for processing the request; (4) the context object becomes a self-contained entity that may be easily passed around to fully describe the request and process it; (5) the context is the event data that also gets posted out to the service bus; (6) once the request is processed in the CRM, a response is returned; and (7) the response contains CRM records or a reply. Thus, in summary a request is made and a context (also known as event data) is used in the pipeline. The pipeline is the request as well as some additional information such as the identity of a caller, organization name, etc. Finally, the response is the CRM data that is returned to the user.

Figure 3:
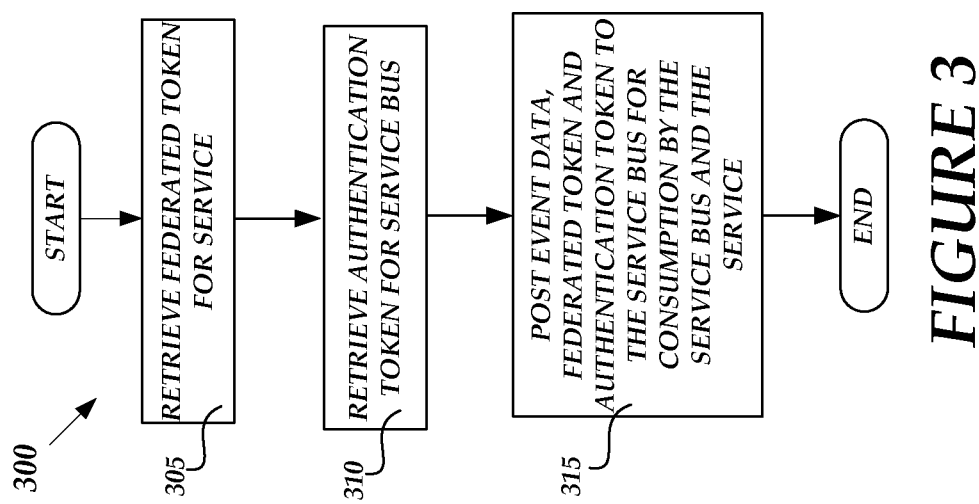
FIG. 3 is a flow diagram illustrating a routine for authenticating a CRM with a service bus and a service in a Federated mode, in accordance with various embodiments.

FIG. 3 is a flow diagram illustrating a routine 300 for authenticating the CRM 70 with the service bus 80 in a Federated mode, in accordance with various embodiments. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 3-5 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where the CRM 70 retrieves a federated token (e.g., from among the tokens 62) from the ACS 60 for the service 81/83. It should be understood that in ACS, there are various scopes which a user may define. Scopes may include methods to group ACS rules. Scopes may further be identified by Uniform Resource Identifiers ("URIs"). In accordance with an embodiment, federated tokens are retrieved from the scope with the same URI as the listening service (i.e., the endpoint URI on the service bus that the service 81/83 is listening to). It should be appreciated that rules may be created in the ACS 60 for the service endpoint 80 such that a federated token may be given out that may be sent to the service 81/83 along with the event data 6. The federated token may flow to the service 81/83 as a custom header. It should be appreciated that the federated token helps the service 81/83 to distinguish between different permissible senders in a tamperproof fashion. As described herein, a federated token is used to signify that the service 81/83 trusts another party to perform authentication. In particular, an authenticating party will authenticate the caller and issue a token that a service can consume to reliably identify the caller.

From operation 305, the routine 300 continues to operation 310 where the CRM 70 retrieves an authentication token for the service bus 50 from the ACS 60 (as described above in FIG. 2 with respect to the Normal authentication mode).

From operation 310, the routine 300 continues to operation 315 where the CRM 70 posts the event data 6, the federated token and the authentication token to the service bus 50 for consumption by the service bus 50 and the service 81/83. In particular, the federated token may be used by the service 81/83 and the authentication token may be used by the service bus 50. It should further be understood that, when posting in Federated mode, the event data 6 may be posted to the service bus 50 with both of the tokens in custom headers. When posting to the service bus 50, the service bus 50 consumes its intended token (i.e., the authentication token) and forwards the event data 6, along with the federated token, to the service 81/83. The service 81/83 may then validate the federated token and consume the federated token and the event data 6. It should be appreciated that the federated token may be used for authorization purposes or for any other use by the service 81/83. From operation 315, the routine 300 then ends.

Figure 4:
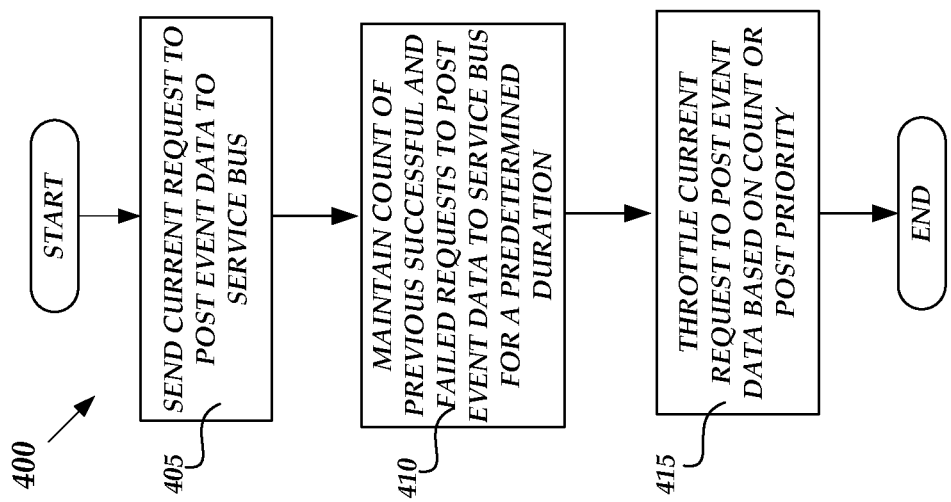
FIG. 4 is a flow diagram illustrating a routine for throttling post requests from a CRM to a service bus in a cloud computing environment, in accordance with various embodiments.

FIG. 4 is a flow diagram illustrating a routine 400 for throttling post requests from the CRM 70 to the service bus 50, in accordance with various embodiments. The routine 400 begins at operation 405, where the CRM 70 sends a current request to post the event data 6 to the service bus 50.

From operation 405, the routine 400 continues to operation 410 where the CRM 70 maintains a count of previous successful and failed requests (i.e., the post request counts 36) to post the event data 6 to the service bus 50 during a predetermined period. In particular, the CRM 70 may be configured to keep a count of successful and failed attempts made to the service bus 50. In accordance with an embodiment, the CRM 70 may also be configured to keep a count of successful and failed attempts per organization (i.e., for each organization) represented within the CRM 70. At the end of the predetermined period, the count may be reset.

From operation 410, the routine 400 continues to operation 415 where the CRM 70 throttles the current request to post the event data 6 based on the count of successful and failed attempts made to the service bus 50 or, alternatively, based on a post priority associated with synchronous and asynchronous requests. In particular, the CRM 70 may use the successful and failed attempts count information to regulate or throttle the number of requests flowing from the CRM 70 to the service bus 50 during a predetermined period. For example, an excess number of failure counts may cause a reduction in the number of post requests made by the CRM 70 to the service bus 50. Throttling may also occur based on a post priority such as when a preference is expressed by a user for synchronous posts versus asynchronous posts to the service bus 50. From operation 415, the routine 400 then ends.

Figure 5:
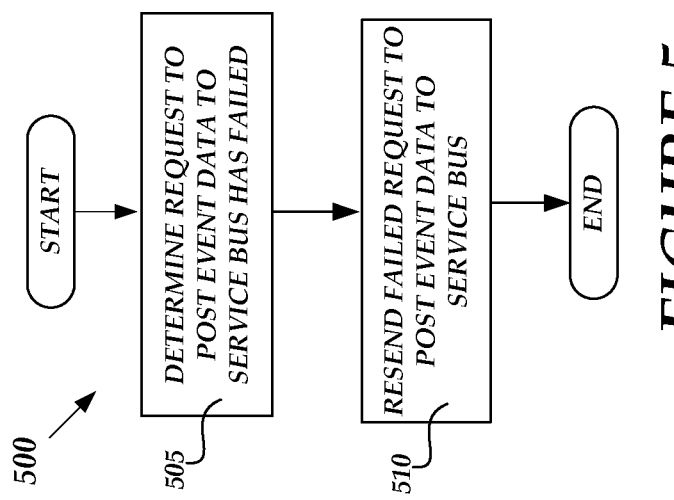
FIG. 5 is a flow diagram illustrating a routine for automatically retrying failed attempts to post event data to a service bus in a cloud computing environment by a CRM, in accordance with various embodiments.

FIG. 5 is a flow diagram illustrating a routine 500 for automatically retrying failed attempts to post the event data 6 to the service bus 50 in the cloud computing environment 4 by the CRM 70, in accordance with various embodiments. The routine 500 begins at operation 505, where the CRM 70 determines that a request to post the event data 6 to the service bus 50 has failed. It should be understood that a failure in posting the event data 6 to the service bus 50 may be due to throttling done by the CRM 70 or due to other issues, such as network errors, when communicating with the service bus 50.

From operation 505, the routine 500 continues to operation 510 where the CRM 70 resends the failed request to post the event data 6 to the service bus 50. In particular, the CRM 70 may be configured to retry the sending of failed requests to post the event data 6 to the service bus 50 at an exponentially increasing interval for a fixed number of attempts (i.e., a threshold). The interval and the threshold number of attempts may be configured in the CRM 70. In accordance with an embodiment, the CRM 70 may be configured to resend failed requests only for event data which is to be posted to the service bus 50 asynchronously. In accordance with another embodiment, retries may be manually initiated by a user. For example, a user may select a job comprising a failed post attempt and retry the post again. It should be appreciated that manual retries may be useful for quickly retrying the posting of event data without having to wait for the automatic retry mechanism (discussed above) to be initiated by the CRM 70. Moreover, manual retries may also be useful for initiating additional retries when a number of automatic retries have crossed the threshold configured in the CRM 70. From operation 510, the routine 500 then ends.

Exemplary Operating Environment

Figure 6:
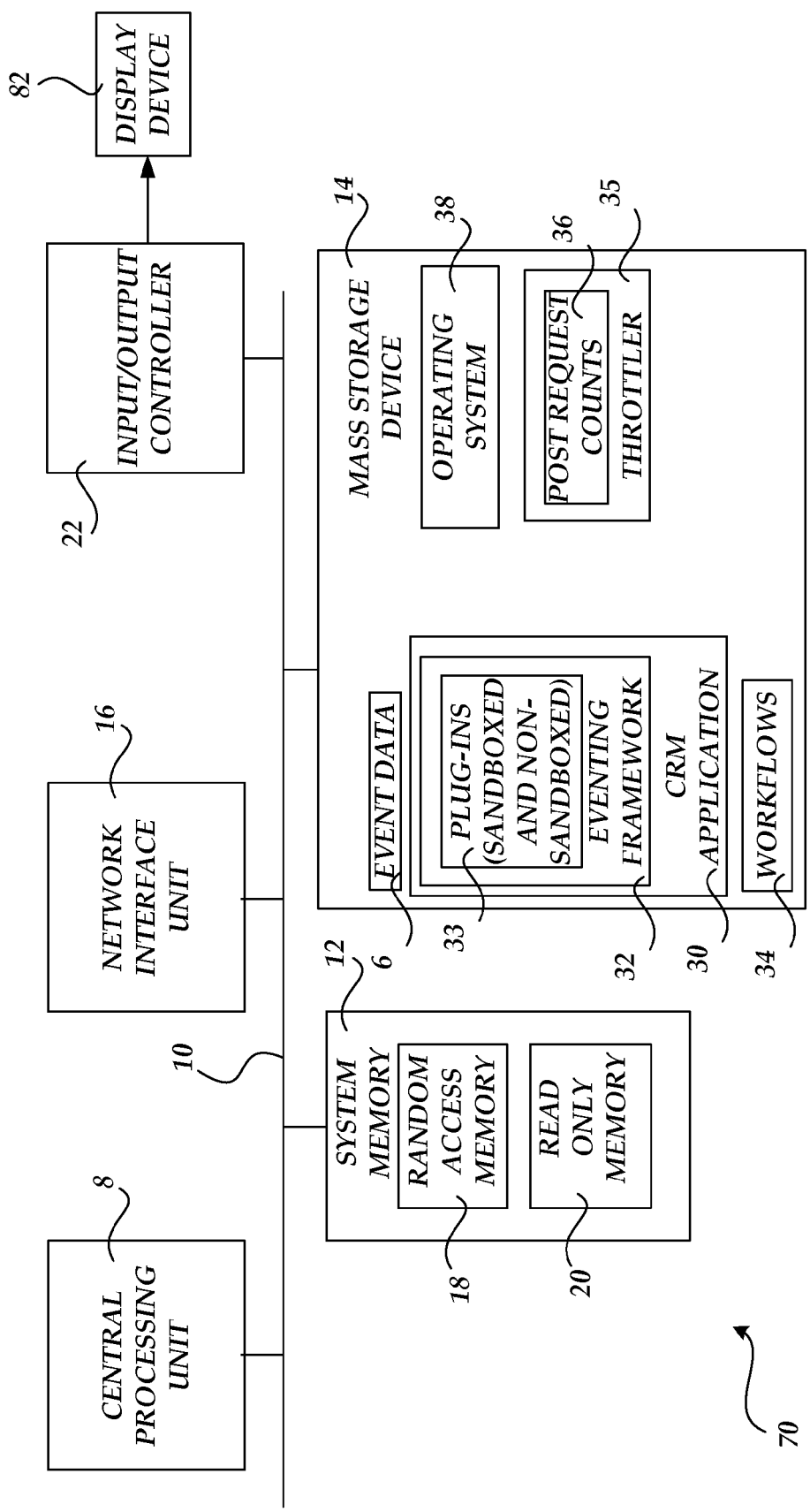
FIG. 6 is a block diagram illustrating a computing environment for extending a CRM eventing framework to a cloud computing environment, in accordance with various embodiments.

Referring now to FIG. 6, the following discussion is intended to provide a brief, general description of a suitable computing environment in which various illustrative embodiments may be implemented. While various embodiments will be described in the general context of program modules that execute in conjunction with program modules that run on an operating system on a computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with a number of computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 6 shows the CRM 70 which may comprise a server computer capable of executing one or more application programs. The CRM 70 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The CRM 70 may further include a mass storage device 14 for storing the event data 6, the CRM application 30 (which further includes the eventing framework 32 and the plug-ins 33), the workflows 34, the throttler module 35, the post request counts 36, and an operating system 38. As discussed above, the post request counts 36 in the throttler module 35 may be maintained by the CRM 70. It should be understood, that in accordance with another embodiment, a throttler module (not shown) may also be implemented in the intermediary router 40. In accordance with various embodiments, the operating system 38 may be suitable for controlling the operation of a networked computer, such as the WINDOWS operating systems from MICROSOFT CORPORATION of Redmond, Wash. The mass storage device 14 is connected to the CPU 8 through a mass storage controller (not shown) connected to the bus 10. The mass storage device 14 and its associated computer-readable media provide non-volatile storage for the CRM 70. Although the description of computer-readable media contained herein refers to a mass storage device, such as a hard disk or CD-ROM drive, it should be appreciated by those skilled in the art that computer-readable media can be any available media that can be accessed or utilized by the CRM 70. By way of example, and not limitation, computer-readable media may comprise computer storage media and communication media.

Computer storage media includes volatile and non-volatile, removable and non-removable hardware storage media implemented in any physical method or technology for the storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, which can be used to store the desired information and which can be accessed by the CRM 70.

Communication media includes any information delivery media. For example, in accordance with an embodiment, communication media may include a wired network or direct-wired connection. In accordance with another embodiment, communication media may include wireless media such as acoustic, RF, infrared, and other wireless media. In accordance with yet another embodiment, communication media may include computer-readable instructions, data structures, program modules or other data in a modulated data signal such as a carrier wave or other transport mechanism. The term "modulated data signal" means a signal that has one or more of its characteristics set or changed in such a manner as to encode information in the signal. Combinations of any of the above should also be included within the scope of computer-readable media. Computer-readable media may also be referred to as a computer program product.

According to various embodiments, the CRM 70 may operate in a networked environment using logical connections to remote computers through a cloud computing environment (i.e., the cloud computing environment 4 shown in FIG. 1). The CRM 70 may connect to the cloud computing environment 4 through a network interface unit 16 connected to the bus 10. It should be appreciated that the network interface unit 16 may also be utilized to connect to other types of networks and remote computing systems. The CRM 70 may also include an input/output controller 22 for receiving and processing input from a number of input types, including a keyboard, mouse, pen, stylus, finger, voice input, and/or other means. Similarly, an input/output controller 22 may provide output to a display device 82, a printer, or other type of output device. Additionally, a touch screen may serve as an input and an output mechanism.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method of extending a customer relationship management (CRM) eventing framework to a cloud computing environment, comprising:
   registering, by a computer, service information for a service in the cloud computing environment, the cloud computing environment further comprising a service bus and an authenticating service, wherein a listening channel is opened between the service and the service bus prior to registering the service information;
   receiving, by the computer, a request made by a requester, the request triggering a request processing pipeline in an eventing framework;
   posting, by the computer, event data responsive to the request to the service bus, wherein posting the event data comprises:
      sending a current request to post the event data to the service bus; and
      throttling the current request to post the event data to the service bus based on a count of previously successful and failed attempts to post the event data to the service bus during a predetermined period, the previously successful and failed attempts count being utilized to regulate a number of requests flowing from a CRM system to the service bus during the predetermined period; and
   sending, by the computer, a response to the requester.

2. The method of claim 1, further comprising receiving, by the computer, a confirmation of retrieval of the event data from the service bus by the service.

3. The method of claim 1, further comprising:
   prior to posting the event data, requesting an authentication token for the service bus from the authenticating service; and
   receiving the authentication token for the service bus from the authenticating service.

4. The method of claim 3, wherein posting, by the computer, event data responsive to the request to the service bus comprises posting the authentication token for the service bus and the event data to the service bus in a custom header, wherein the authentication token for the service bus is validated by the service bus.

5. The method of claim 1, further comprising:
   prior to posting the event data, retrieving a federated token for the service from the authenticating service;
   retrieving an authentication token for the service bus from the authenticating service.

6. The method of claim 5, wherein posting by the computer, event data responsive to the request to the service bus comprises posting the event data, the federated token for the service and the authentication token for the service bus to the service bus, wherein the authentication token for the service bus is consumed by the service bus and the event data and the federated token for the service is forwarded from the service bus to the service, wherein the federated token for the service is validated by the service.

7. The method of claim 1, wherein posting, by the computer, event data responsive to the request to the service bus comprises at least one of:
   utilizing a CRM workflow to post the event data to the service bus, wherein the CRM workflow is triggered upon a request by the requester for CRM data;
   utilizing custom plug-ins to post the event data to the service bus;
   posting the event data to the service bus via an intermediary router; and
   at least one of synchronously and asynchronously posting the event data to the service bus.

8. The method of 1, further comprising:
   determining that a request to post the event data to the service bus has failed; and
   resending the failed request to post the event data to the service bus.

9. The method of claim 1, wherein an excess number of failure counts causes a reduction in a number of post requests made by the CRM system to the service bus.

10. A customer relationship management (CRM) computer system for extending a CRM eventing framework to a cloud computing environment, comprising:
   a memory for storing executable program code; and
   a processor, functionally coupled to the memory, the processor being responsive to computer-executable instructions contained in the program code and operative to:
      register service information for a service in the cloud computing environment, the cloud computing environment comprising a service bus and an authenticating service, wherein a listening channel is opened between the service and the service bus prior to registering the service information;
      receive a request made by a requester, the request triggering a request processing pipeline in an eventing framework;

post event data responsive to the request to the service bus, wherein the processor, in posting the event data, is operative to:
    send a current request to post the event data to the service bus; and
    throttle the current request to post the event data to the service bus based on a count of previously successful and failed attempts to post the event data to the service bus during a predetermined period, the previously successful and failed attempts count being utilized to regulate a number of requests flowing from a CRM system to the service bus during the predetermined period;
receive a confirmation of retrieval of the event data from the service bus by the service; and
send a response to the requester.

11. The system of claim 10, wherein the processor is operative to:
prior to posting the event data, request an authentication token for the service bus from the authenticating service; and
receive the authentication token for the service bus from the authenticating service.

12. The system of claim 11, wherein the processor is operative to post the authentication token for the service bus and the event data to the service bus in a custom header, wherein the authentication token for the service bus is validated by the service bus.

13. The system of claim 10, wherein the processor is operative to:
prior to posting the event data, retrieve a federated token for the service from the authenticating service;
retrieve an authentication token for the service bus from the authenticating service.

14. The system of claim 13, wherein the processor is operative to post the event data, the federated token for the service and the authentication token for the service bus to the service bus, wherein the authentication token for the service bus is consumed by the service bus and the event data and the federated token for the service is forwarded from the service bus to the service, wherein the federated token for the service is validated by the service.

15. The system of claim 10, wherein the processor, in posting event data responsive to the request to the service bus, is operative to perform at least one of the following:
utilize a CRM workflow to post the event data to the service bus, wherein the CRM workflow is triggered upon a request by the requester for CRM data;
utilize custom plug-ins to post the event data to the service bus;
post the event data to the service bus via an intermediary router; and
at least one of synchronously and asynchronously post the event data to the service bus.

16. The system of claim 10, wherein the processor is further operative to:
determine that a request to post the event data to the service bus has failed; and
resend the failed request to post the event data to the service bus.

17. The system of claim 10, wherein an excess number of failure counts causes a reduction in a number of post requests made by the CRM system to the service bus.

18. A computer-readable storage medium, wherein the computer-readable storage medium does not include a transmission signal, the computer-readable storage medium comprising computer-executable instructions which, when executed by a computer, will cause the computer to perform a method of extending a customer relationship management (CRM) eventing framework to a cloud computing environment, comprising:
registering, in a CRM system, service information for a service in the cloud computing environment, the cloud computing environment comprising a service bus and an authenticating service, wherein a listening channel is opened between the service and the service bus prior to registering the service information;
receiving a user request made by a user of the CRM system, the request triggering a request processing pipeline in an eventing framework;
retrieving a federated token for the service from the authenticating service;
retrieving an authentication token for the service bus from the authenticating service;
at least one of synchronously and asynchronously posting event data responsive to the request to the service bus, wherein at least one of synchronously and asynchronously posting event data responsive to the request to the service bus comprises:
    sending a current request to post the event data to the service bus;
    throttling the current request to post the event data to the service bus based on a count of previously successful and failed attempts to post the event data to the service bus during a predetermined period, the previously successful and failed attempts count being utilized to regulate a number of requests flowing from the CRM system to the service bus during the predetermined period;
    posting the event data, the federated token for the service and the authentication token for the service bus to the service bus, wherein the authentication token for the service bus is consumed by the service bus and the event data and the federated token for the service is forwarded from the service bus to the service, wherein the federated token for the service is validated by the service;
    utilizing a CRM workflow to post the event data to the service bus, wherein the CRM workflow is triggered upon a request by the requester for CRM data;
    utilizing sandbox and non-sandbox plug-ins to post the event data to the service bus; and
    posting the event data to the service bus via an intermediary router;
receiving a confirmation of retrieval of the event data from the service bus by the service; and
sending a response to the user.

19. The computer-readable storage medium of claim 18, further comprising:
determining that a request to post the event data to the service bus has failed; and
resending the failed request to post the event data to the service bus.

\* \* \* \* \*